(12) United States Patent
Kelley, Jr.

(10) Patent No.: US 10,469,364 B2
(45) Date of Patent: *Nov. 5, 2019

(54) SYSTEM AND METHOD FOR REAL-TIME LOAD BALANCING OF NETWORK PACKETS

(71) Applicant: NetScout Systems, Inc., Westford, MA (US)

(72) Inventor: Bruce A. Kelley, Jr., Westford, MA (US)

(73) Assignee: NetScout Systems, Inc., Westford, MA (US)

( * ) Notice: Subject to any disclaimer, the term of this patent is extended or adjusted under 35 U.S.C. 154(b) by 62 days.

This patent is subject to a terminal disclaimer.

(21) Appl. No.: 15/905,589

(22) Filed: Feb. 26, 2018

(65) Prior Publication Data

US 2018/0191605 A1    Jul. 5, 2018

Related U.S. Application Data

(62) Division of application No. 13/647,503, filed on Oct. 9, 2012, now Pat. No. 9,923,808.

(51) Int. Cl.

| | | |
|---|---|---|
| H04L 12/26 | (2006.01) | |
| H04L 12/28 | (2006.01) | |
| H04L 12/801 | (2013.01) | |
| H04L 29/06 | (2006.01) | |
| G06F 17/30 | (2006.01) | |
| H04W 24/00 | (2009.01) | |

(Continued)

(52) U.S. Cl.
CPC ........ *H04L 45/24* (2013.01); *H04L 29/12405* (2013.01); *H04L 61/2528* (2013.01); *H04W 24/00* (2013.01); *H04W 24/08* (2013.01); *H04W 28/08* (2013.01); *H04W 76/12* (2018.02)

(58) Field of Classification Search
None
See application file for complete search history.

(56) References Cited

U.S. PATENT DOCUMENTS

| | | |
|---|---|---|
| 7,586,899 B1 | 9/2009 | Mohaban et al. |
| 8,248,928 B1 | 8/2012 | Wang et al. |

(Continued)

*Primary Examiner* — Nicholas R Taylor
*Assistant Examiner* — Ho T Shiu
(74) *Attorney, Agent, or Firm* — Locke Lord LLP; Scott D. Wofsy; Christopher J. Capelli (57) ABSTRACT

Internet protocol packets are statelessly identified as associated with a particular session-instance by identifying a key, or session-instance identifier, within the data (or payload) portion of a user plane packet. This identifier is specific to the session-instance and remains constant throughout the session-instance. Using this stateless identification, transmitted user plane packets are automatically routed at the transmission speed of the transmission link using a method that automatically balances the analysis processing load between network probes. The load is balanced by routing the user plane packet to a network probe that is either already analyzing the session-instance or by routing the user plane packet to a system that has processing capacity to analyze a new session-instance. The network probe then analyzes the user plane packet and the session-instance to measure the quality of the user experience of the session-instance and performance of the network.

4 Claims, 5 Drawing Sheets

(51) Int. Cl.
*H04W 4/06* (2009.01)
*H04W 28/08* (2009.01)
*H04W 36/08* (2009.01)
*H04L 12/707* (2013.01)
*H04L 29/12* (2006.01)
*H04W 24/08* (2009.01)
*H04W 76/12* (2018.01)

(56) References Cited

U.S. PATENT DOCUMENTS

| | | | |
|---|---|---|---|
| 2002/0099843 A1* | 7/2002 | Fruchtman | H04L 29/06 709/232 |
| 2007/0165622 A1 | 7/2007 | O'Rourke et al. | |
| 2011/0116510 A1 | 5/2011 | Breslin et al. | |
| 2011/0249572 A1 | 10/2011 | Singhal et al. | |
| 2011/0302320 A1 | 12/2011 | Dunstan et al. | |
| 2011/0310907 A1 | 12/2011 | Klein et al. | |
| 2012/0120815 A1 | 5/2012 | Anderson et al. | |
| 2012/0320788 A1* | 12/2012 | Venkataramanan | H04L 47/2458 370/253 |
| 2013/0272127 A1 | 10/2013 | Ali et al. | |
| 2013/0272136 A1 | 10/2013 | Ali et al. | |
| 2014/0226679 A1 | 8/2014 | Wang | |

* cited by examiner

SYSTEM AND METHOD FOR REAL-TIME LOAD BALANCING OF NETWORK PACKETS

This application is a divisional of U.S. patent application Ser. No. 13/647,503 filed on Oct. 9, 2012, the disclosure of which is incorporated by reference herein in its entirety.

BACKGROUND

This invention relates generally to monitoring data packets transmitted over a network, and more specifically to real-time load balancing of packets between multiple network probes.

To optimize the performance and operation of modern computer networks, network operators routinely use network probes to monitor network traffic as well as measure end-user experience by calculating performance and quality parameters in real-time. These parameters include, but are not limited to, bit rate, jitter, packet drop rate or bit error rate, and packet latency. However, the enormous, and increasing, amounts of data transmitted over wired and wireless networks at high data transfer speeds, particularly with the introduction of the 10 gigabit ("10 GbE") networking standard, present a challenge to real-time monitoring of network performance.

Network performance monitoring is further complicated by telecommunications routers and gateways using new architectures, some of which are designed to support the 10 GbE networking standard for mobile networks. These architectures are also used, in part, to enable network service providers to prioritize certain types of network traffic. Unlike prior architectures, control plane and user plane packets corresponding to a single session-instance (that is, one of potentially many sessions operating on a single client device) are not necessarily transmitted through a network using the same link between a first gateway and a second gateway. Because control plane and user plane packets corresponding to a single session-instance can travel on different links, the network probes may be unable to track the packets corresponding to an end-user's single session-instance, and therefore be unable to monitor the session performance and/or quality of the network.

Furthermore, because the user plane and control plane packets corresponding to a single session-instance do not necessarily travel on the same link between the first gateway and the second gateway, the network probes used to monitor network performance and/or quality can be under- or over-utilized. That is, the distribution of packets (whether user plane or control plane) sent to each network probe can become unbalanced, leading to some systems becoming overwhelmed with packets while other systems are under-utilized. Therefore, because session-instances cannot be analyzed as a whole and because the packet distribution between the network probes is uneven, the ability to monitor network performance and/or quality in real-time, and the ability to respond to network conditions in real-time, is inhibited.

SUMMARY

Embodiments described herein include methods and systems for stateles sly identifying user plane and control plane packets (collectively "packets") associated with a session-instance of a user client. As used herein, the term "session-instance" refers to a particular interchange of packets transmitted between a first gateway and a second gateway occurring between an initiating event and a terminating event. The interchange of packets corresponds to a single set of operations or a single application. This distinction is useful in that a single device, such as a user client, may execute multiple session-instances within the framework of a single session. For example, a mobile communications device user may initiate a session by turning on the device and establishing a connection to a communication network, and execute multiple session-instances within the session by making voice calls, checking email, using various mobile applications, and web browsing.

The stateless identification of packets is used to identify and group the various packets in a session-instance even when control plane and user plane packets of a session-instance travel on different links, instead of the same link, between servers (described also as "gateways" herein). That is, a data packet (whether a user plane packet or a control plane packet) is identified as a packet of a particular session-instance without reference to any other user plane or control plane packet and without requiring all packets of the session-instance to be transmitted over the same link. In other words, identification of a user plane packet is not dependent upon the transmission link used, nor is the identification dependant on a reference to previously transmitted control plane packets. As described herein, stateless identification is accomplished by identifying a key within the data (or payload) portion of a data packet that is specific to the session-instance. This permits each packet to be identified with a session-instance regardless of the transmission links used to transmit prior packets.

This stateless identification is an advantage of the methods and systems disclosed herein because it enables the tracking of packets of a single session-instance even if the packets travel over different links between gateways. This enables user plane packets of the session-instance to be routed, at approximately the line rate of the transmission network, to the same network probe. The probe identifies a user session-instance by linking together control packets and user plane packets for the session-instance. The packets of the session-instance are then analyzed to measure the quality of the end user experience and performance of the user session-instance (e.g., bit rate, jitter, packet drop rate or bit error rate, packet latency, voice quality, browsing quality, dropped call rate, network connection success rate, etc.).

The method of routing of packets at the approximate line rate described below includes two features: 1) automatically assigning session-instances to network probes such that the analysis processing load of packets is balanced between the various systems; and 2) routing all user plane packets of a particular session-instance to the same network probe system so that a session-instance can be analyzed as a whole. These features are achieved even if the control plane packets and/or user plane packets for a session-instance are transmitted on different transmission links connecting routers.

While the term "packet" is used throughout the present disclosure, it can encompass control plane and user plane packets in their as-transmitted state, and can also encompass packets that have been processed to remove duplicative or redundant data to improve processing efficiency and speed. Examples of these processed packets include, but are not limited to, adaptive session records as described in U.S. patent application Ser. No. 12/756,638 entitled "Real-Time Adaptive Processing of Network Data Packets for Analysis" and filed on Apr. 8, 2010, which is incorporated by reference herein in its entirety.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Network Transmission System

Figure 1:
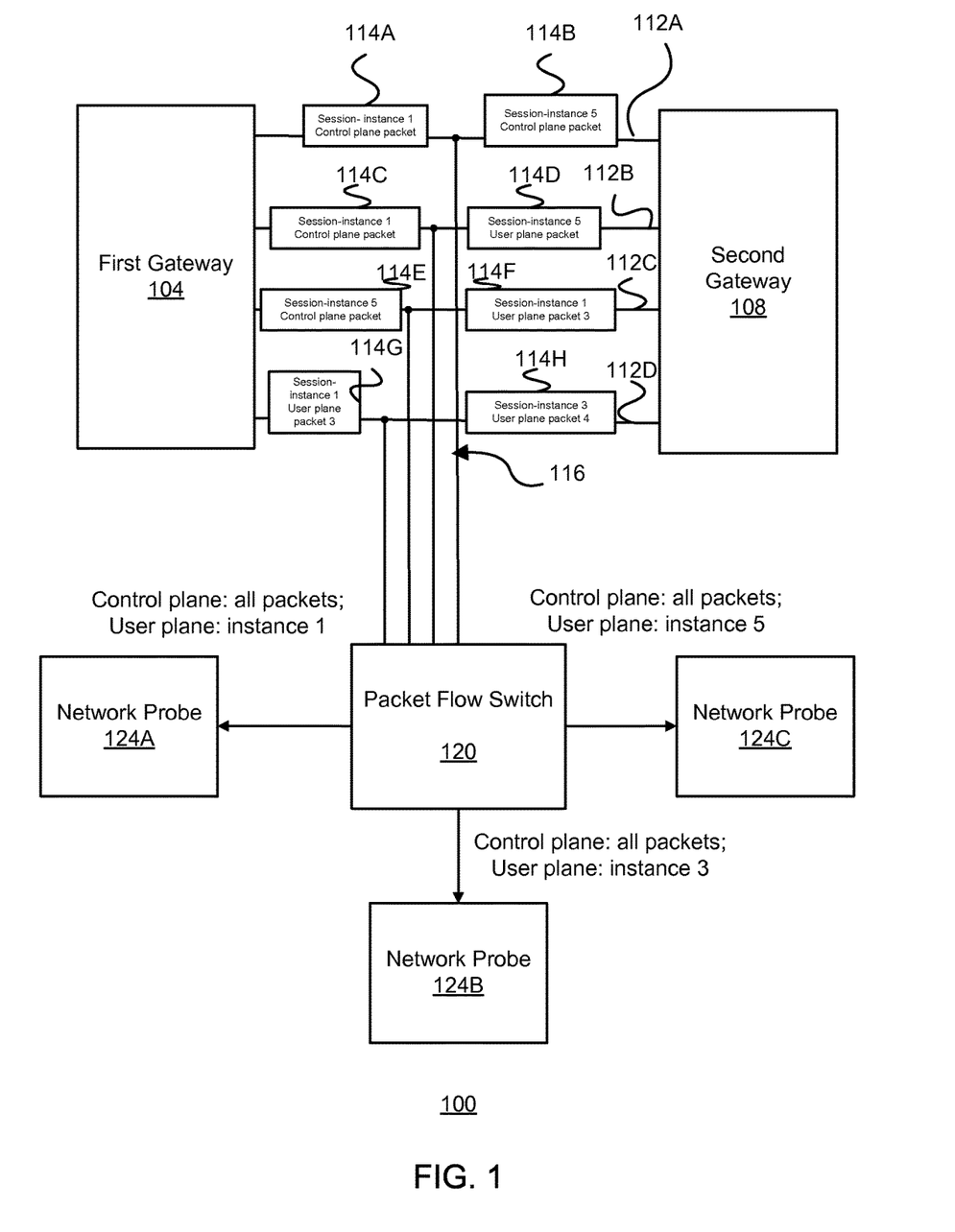
FIG. 1 is an illustration of a network transmission system for transmitting data packets between a first gateway and a second gateway and for distributing the packets for analysis between multiple network probes using a packet flow switch, in an embodiment.

FIG. 1 illustrates an embodiment of a network transmission system 100 capable of transmitting packets associated with a particular session-instance using different transmission links between a first gateway and a second gateway. The example network transmission system 100 is also configured to automatically balance the network monitoring load between several network probes at or near the data transmission rate ("line rate" or "approximate line rate") of the network transmission system. In this example, the network transmission system 100 includes a first gateway 104, a second gateway 108, a plurality of transmission links 112A-D (collectively "112"), a plurality of transmission link taps 116, a packet flow switch 120, and network probes 124A-C (collectively "124").

In this example, the first gateway 104 and the second gateway 108 are network nodes that are used to transmit and receive packets that either originate at or are received at user clients and gateways. Examples of the first and second gateways 104 and 108 include s-gateways, p-gateways, the CISCO ASR 5500 server using the NEO architecture, and others.

The transmission links 112 convey control and user plane packets, such as packets 114A-D, that are transmitted between the gateways 104 and 108 through any of a variety of networks, including the Internet (e.g., networks using TCP/IP protocol transmission), wireless communication networks (e.g., 3G, 4G LTE protocol networks), networks internal to an organization or entity (e.g, WLAN, LAN), and combinations thereof.

The taps 116 are connections to the various transmission links 112 and are designed to copy packets transmitted through the links and provide the copied packets to the network probes 124 (through the packet flow switch 120) so that the probes can monitor the performance of the network and the quality of the user experience by analyzing the packets. The taps 116, such as passive taps, filterable taps, and others, include, but are not limited to XFP ports, UTP ports, SFP ports, or other similar means of connecting to the transmission links 112 and capturing the transmitted packets for analysis.

The packet flow switch 120 connects to each link of the plurality of transmission links 112 via the taps 116 in order to receive, identify, and distribute the packets transmitted between the first gateway 104 and the second gateway 108. In addition to taps 116, other tools and methods may be used to receive and distribute the packets, such as using a spanning port. The packet flow switch 120 directs transmitted packets provided by the taps 116 using methods and systems described in more detail below. Examples of the packet flow switch 120 include network routers and filters capable of monitoring and directing data packets, such as the NGENIUS 1500 produced by NetScout Systems, Inc. of Westford, Mass.

Figure 3A:
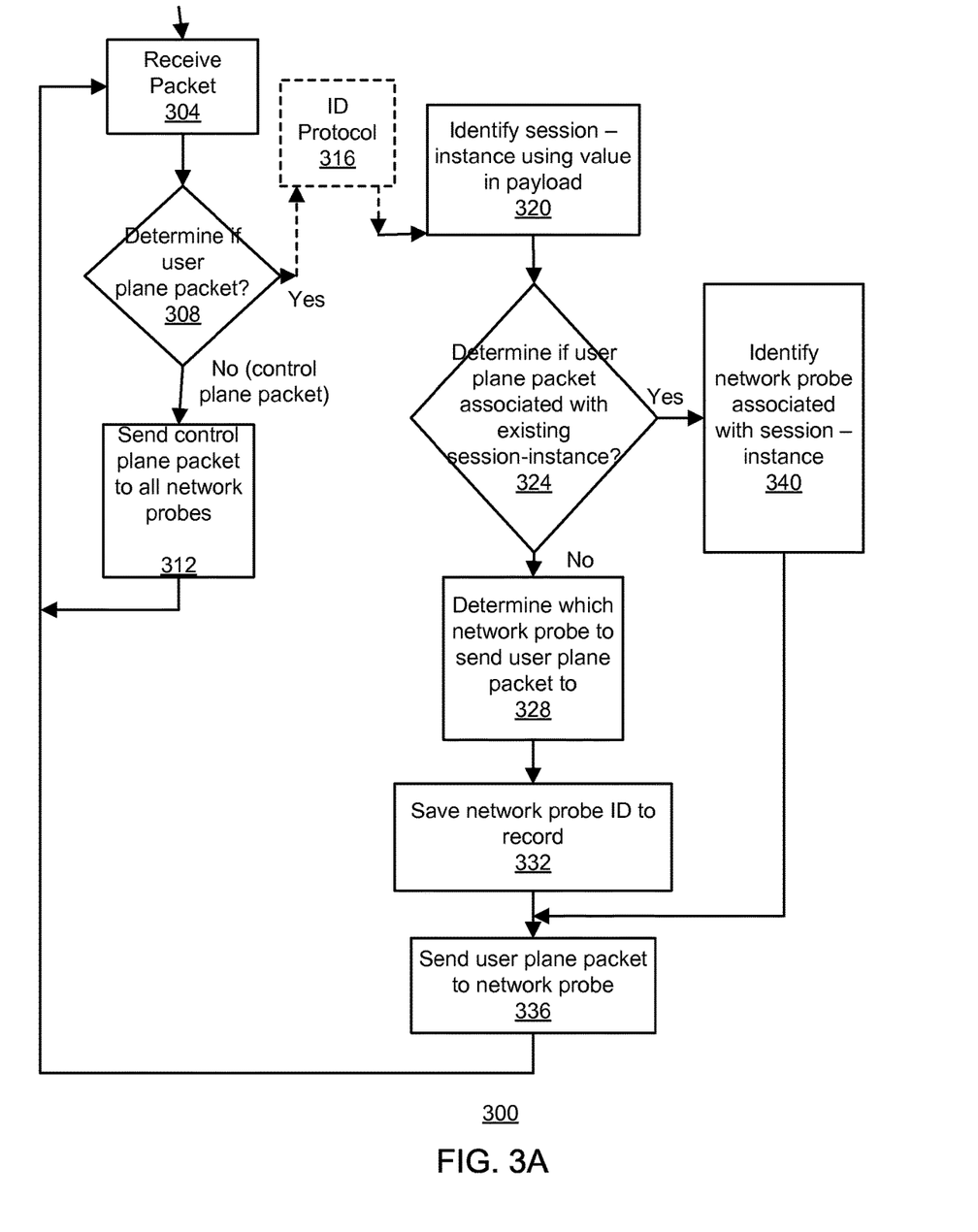
FIG. 3A is a flow diagram illustrating a method for statelessly identifying packets of a session-instance transmitted through different links connecting a first gateway and a second gateway, and balancing the distribution of packets between multiple network probes using the stateless packet identification, in an embodiment.

The packet flow switch 120 distributes the packets to the various network probes 124 shown connected to the packet flow switch using the method 300 described in the context of FIG. 3A. The packet flow switch 120 can also distribute the packets to other systems, including, but not limited to, security, and financial transaction systems (such as billing), and other systems using the packets for any of a variety of purposes.

The packet flow switch 120 identifies packets associated with a particular session-instance even when the packets of the session-instance are transmitted to and from the first gateway 104 and the second gateway 108 on different links of the plurality of transmission links 112. That is, the method 300 enables packets associated with a session-instance to be statelessly identified and routed to the appropriate network probes 124 even when a user plane packet of a session instance is transmitted on a first link that is different from a second link used to transmit a control plane packet of the same session instance. This is shown in FIG. 1 by both user plane and control plane packets from multiple session-instances being transmitted simultaneously on multiple transmission links 112. For example, on transmission link 112A, a control plane packet 114A of a session-instance "1" is transmitted along with a control plane packet 114B of a session-instance "5". On transmission link 112B, a control plane packet 114C from the session-instance 1 is transmitted along with a user plane packet 114C from session-instance 5. Similar simultaneous transmissions of multiple packet types (user plane and/or control packets) from multiple, and random, session-instances can occur on each of transmission links 112C and 112D, as is shown by packets 114E-H on transmission links 112C and 112D.

This transmission of multiple packet types from multiple session-instances on a single transmission link is in contrast to other systems, in which the control plane packet and all subsequent user plane packets are transmitted on the same link of the plurality of transmission links 112, and in which the control plane information is recorded and referred to in order to identify subsequently transmitted user plane packets as part of the session-instance. Using stateless identification and routing that enables the association of a packet (particularly a user plane packet) with a specific session-instance without continuing reference to the control plane information, the packet flow switch 120, at the approximate line rate of the network, balances the distribution of session-instance packets between the various network probes 124.

The network probes 124 are hardware, software, firmware, or combinations thereof, for monitoring data transmission through the plurality of transmission links 112. While generally the network probes 124 may be deployed at any of a variety of locations or links of the network 100 to collect network data packets transmitted through the links 112, in this case the network probes are connected to the network through the packet flow switch 120 which, as described above, permits balancing of the session-instance load between the multiple network probes. The network probe 124 may be a special purpose computing device or a software component (not limited to a single process) dedicated to monitoring data communicated via the network 100. Alternatively, the network probe 124 may be a general purpose computing device with specialized software components installed thereon. In one embodiment, the network probe 124 is a NGENIUS COLLECTOR, NGENIUS PROBE or NGENIUS INFINISTREAM, available from NetScout Systems, Inc. of Westford, Mass.

In this example, after collecting the packets (user plane and control plane), the network probes 124 generate an ASI data set that can include key performance indicators and adaptive session records ("ASRs") as described in U.S. patent application Ser. No. 12/756,638 entitled "Real-Time Adaptive Processing of Network Data Packets for Analysis" and filed on Apr. 8, 2010. The methods and systems described in U.S. patent application Ser. No. 12/756,638 enable the network probe 124 to analyze network performance and end user experience in real-time, without extensive network buffering and analysis.

Figure 2:
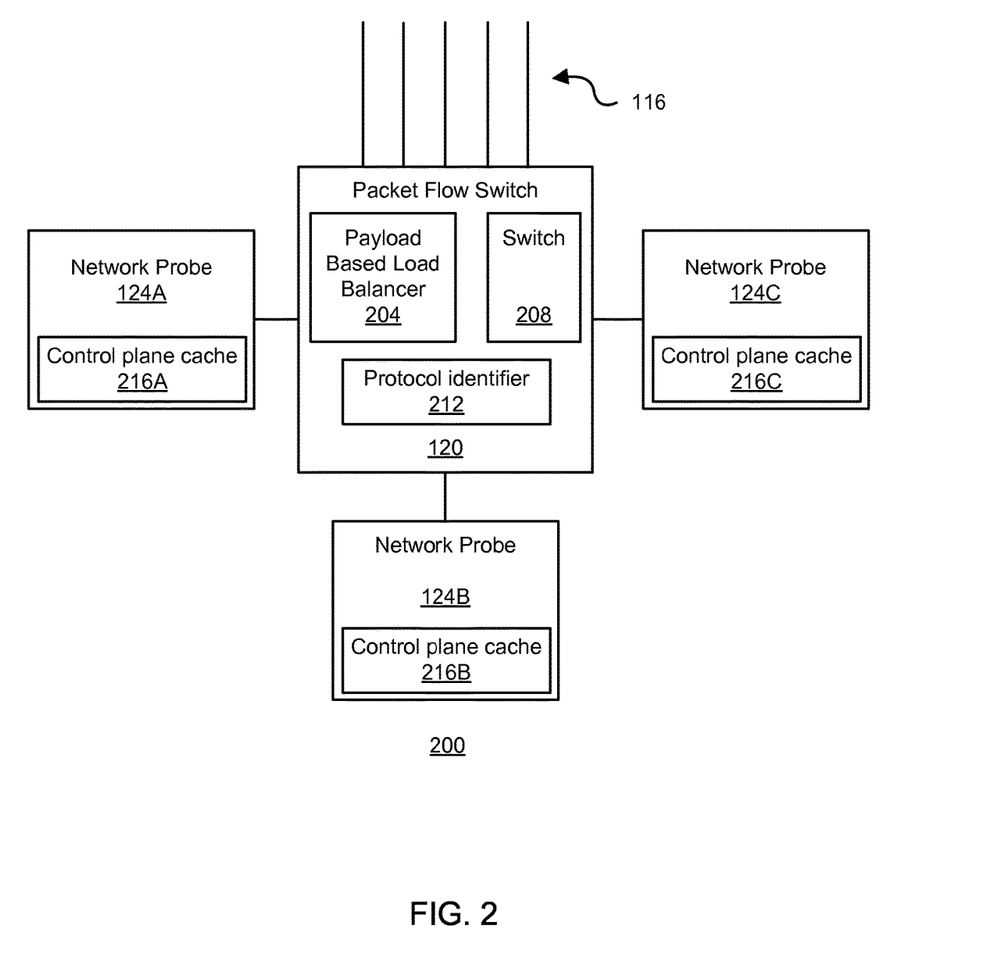
FIG. 2 is an illustration of a packet flow switch that is in communication with multiple network probes, using a real-time, automatic load balancing method to distribute packets to the network probes, in an embodiment.

FIG. 2 is an illustration of a sub-system 200 of the network 100. The sub-system 200 includes, in this example, the packet flow switch 120 includes a packet payload-based load balancer 204, a switch 208 and an optional protocol identifier 212. Each of the network probes 124 includes a control plane cache memory 216A-C ("216" collectively).

The packet payload-based load balancer 204 of the packet flow switch 120 applies the method 300, described below in detail in the context of FIG. 3A, to identify the appropriate network probe 124 to which to route a user plane packet received through one of the plurality of taps 116. Determining which network probe 124 is appropriate for the packet can be based on a number of factors including, but not limited to, whether the packet is a control plane or user plane packet, and whether the packet initiates a new session-instance or is associated with a current session-instance that is already being analyzed by one of the network probes. The load balancer 204, in executing the method 300, statelessly identifies the packet and the session-instance to which the packet belongs, and correlates that identity with the appropriate network probe 124.

The switch 208 receives the identity of the network probe 124 to which the packet should be directed, as provided by the packet payload-based balancer 204. Once the identity of the network probe 124 is provided, the switch 208 then directs the packet to the assigned network probe at the approximate line rate of the transmission link 112.

The switch 208 also distinguishes between packets of the user plane and those of the control plane. As will be explained in more detail in the context of FIG. 3A, every control plane packet is provided to every network probe 124 for storage in the control plane cache 216 of the network probes. Control plane packets are provided at or near the initiation of a session-instance and include data that can include protocol, syntax, IP addresses, message type, phone number, international mobile subscriber identity ("IMSI"), etc. of the session-instance. This information comprises a relatively small amount of data compared to the user plane packets. In embodiments, the sub-system 200 enables the control plane information of every session-instance to be available to every network probe 124, regardless of the system to which the switch 208 routes the user plane packets of a session-instance.

The user plane packet protocol identifier 212 identifies the protocol corresponding to the user plane packet of the session-instance, thereby enabling the various components of the sub-system 200 to receive, and analyze the user plane packet. The protocol identifier 212 can automatically identify the protocol of the packet by, for example, detecting a protocol specific application being executed, detecting protocol-specific patterns within the payload of the packet, or other similar methods of identifying a feature of the packet that is specific to the protocol. For examples in which auto-detection of the protocol is not used, the sub-system 200 can be designed such that the network probes 124 are configured to accept packets of known protocol types. In one embodiment of this example, the network probe 124 is coupled to a protocol specific interface (e.g., an SIu or Gn interfaces).

The control plane caches 216A-C, in communication with the network probes 124A-C respectively, each store nearly all of the control plane packets corresponding to on-going session-instances. As mentioned above, by distributing all control plane packets to every network probe 124, the control plane information for every subsequent user plane packet is available, regardless of which network probe the session-instance (and the associated user plane packets) is assigned. This then enables the network probes 124 to reference control plane information corresponding to the session-instance as needed.

While control plane data comprises a relatively small portion of the data transmitted as part of the session-instance, control plane data corresponding to terminated or dormant sessions need not be stored in the control plane caches. The network probes 124 can execute a data purging process on the control plane caches 216 to remove control plane information that is no longer being used, or never used, by an active session-instance. Each control plane cache 216 can be purged of stale control plane data by identifying session-instances that are no longer active, or were never active. Criteria used to judge the inactivity of a particular session-instance includes the duration of the session-instance, a time since the last packet was transmitted through the network 100, a time since the last bit was transmitted through the network, a packet count within a particular time window, and other similar measurements of activity. Once a particular session-instance has been identified as inactive, the control data is removed from the control plane caches 216. This method is explained in more detail in the context of FIG. 4.

The control plane caches 216 can be any type of readily accessible memory that can be written to and deleted by the network probes 124 including random-access memory (e.g., S-RAM), magnetic memory, rewritable optical memory, and others.

Method for Real-Time Load Balancing

FIG. 3A illustrates an example method 300 for automatically balancing the assignment of session-instance user plane packets between the network probes 124 of the network 100, and automatically routing user plane packets (at the approximate line rate of the transmission network) of an existing session-instance to the network probe analyzing the session-instance. By balancing the distribution of user plane packets between the network probes 124, the computing load used to analyze conditions (quality of service, performance, end user experience, etc.) exhibited within a session-instance is also distributed among the probes, thereby facilitating real-time, line rate (or approximate line rate) analysis of a session-instance.

The method 300 begins by receiving 304 a packet at the packet flow switch 120 via one of the plurality of taps 116 connected to the plurality of transmission links 112. The payload load balancer 204 of the packet flow switch 120 determines 308 whether the received packet is associated with the user plane or the control plane. If the packet is a control plane packet (containing information regarding the protocol, syntax, phone number, IMSI, etc.) of the session-instance, then the control plane packet is sent 312 to all of the network probes 124 (as also shown in FIG. 1). As explained above, providing control plane packets to all of the network probes 124 (specifically the control plane caches 216) maintains the connection between the user packets of a session-instance and the corresponding control plane information regardless of which network probe the session-instance is assigned to.

If the received packet is determined 308 to be in the user plane, then the protocol of the session-instance can optionally be determined 316 using the techniques described above in the context of the protocol identifier 212 of the packet flow switch 120. That is, the protocol identifier 212 can determine the protocol by automatically recognizing protocol specific patterns within the payload of the user plane packet, or determining the protocol using any of the other example determination methods presented above.

Having determined 308 the received packet is in the user plane, the session-instance of the packet is identified 320 using a value in the payload portion of the user plane packet, thereby statelessly identifying a packet as part of a particular session-instance. That is, using the value in the payload of the user plane packet to associate the packet with a particular session-instance does not depend on determining the connection of the user plane packet with any other packet, including the associated control plane packets. An advantage of using this stateless identification method is that user plane packets transmitted on different transmission links 112 between gateways (e.g., the first gateway 104 and the second gateway 108) can still be identified, associated with a session-instance, and routed to the appropriate network probe 124 at the approximate line rate of the transmission link without reference to the control plane.

Figure 3B:
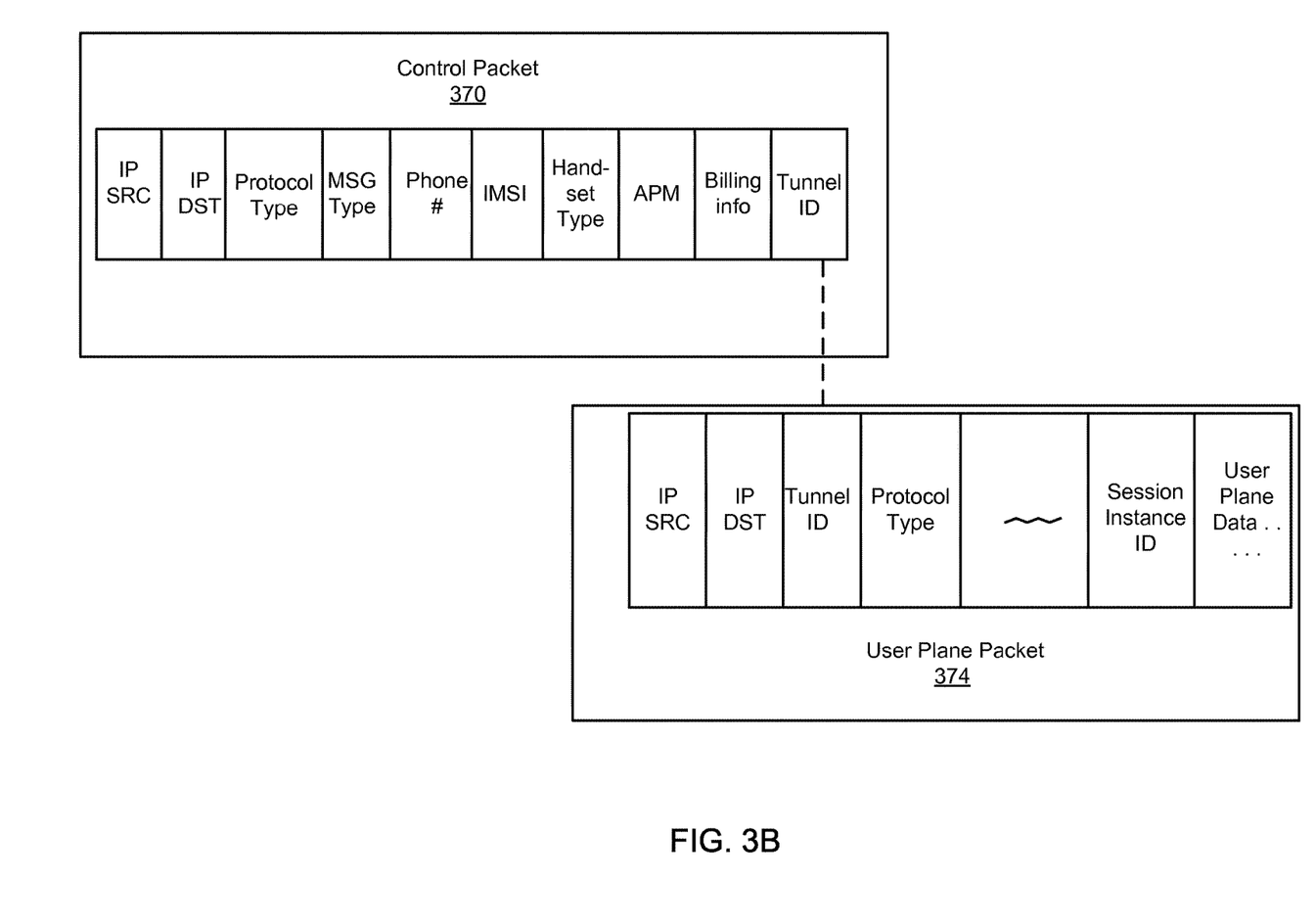
FIG. 3B is an illustration showing various example fields of an example control packet and an example user plane packet, and a common field between the two used for statelessly identifying both packets as part of a same user session-instance, in an embodiment.

The types of values in the payload portion of a user plane packet used to associate a user plane packet with a particular session-instance are those that do not change during the session-instance, and are specific to the session-instance. In the example of IP Ethernet packets, this session-instance identifier is a 4-byte integer in the data portion of the IP packet known as the GTP field that corresponds to a GTP protocol within the packet. While the GTP field is used in this example, other fields within an IP packet that do not change between packets of a session-instance can also be used. For example, as shown in FIG. 3B, the "Tunnel ID" field is common to both an example control packet 370 and an example user plane packet 374. In this example, the Tunnel ID, which is a temporarily assigned unique identifier of a user session-instance, can be used to statelessly associate a user plane packet with a control packet of a same session-instance, even when the packets are transmitted discontinuously in time over different transmission links. Similarly, for non-Ethernet packets, fields having values specific to the session-instance and remain constant between packets of a session-instance can be used to statelessly identify a packet as being part of a particular session-instance.

In some examples, the fields used to identify packets of a session-instance are located by using a reference point of the packet that is constant between the various packets. For example, the field used as the session-instance identifier can be located using a known number of bits (an "offset") measured from a start of the header portion of the user plane packet. Because the field used to statelessly identify the user plane packet is a fixed number of bits from the start of the header, it can be found easily in every transmitted packet. In another example of a user plane packet that includes a header of fixed length, the session-instance identifier is identified using a number of bits from the end of the header portion of the packet. In yet another example, the session-instance identifier is a known key or pattern of bits within the data portion or the header portion of the user plane packet that specifically identifies the session-instance. In this example, the entire packet can be scanned for the presence of this identifying pattern, even if the location of the pattern is variable (i.e., is known not to occur at an expected location within the data packet).

Once the session-instance has been identified 320 using a value in the payload portion of the user plane packet, the system determines 324 if the user plane packet is associated with a new session (that is, a session not already associated with any previously transmitted packets) or if the user plane packet is associated with an existing session-instance. In some examples, this determination 324 is accomplished by referencing a stored record of all existing session-instance identifiers. That is, when a new session-instance is identified, the session-instance identifier is stored in the record. The session-instance identifier is removed from the record upon tear-down of the session-instance. In other examples, another event signaling the termination of the session-instance can trigger removal of the session-instance identifier from the record, such as deletion of the control plane information from the control plane cache 216. The storage of new session-instance identifiers and deletion of session-instance identifiers corresponding to terminated session-instances enables accurate determination 324 of whether the user plane packet is associated with an existing session-instance.

If the user plane packet is determined 324 not be associated with an existing session-instance by reference to the record of session-instances, then the system 100 determines 328 which of the network probes 124 will receive the user plane packet, and therefore which probe will analyze the session-instance for network quality and end user performance metrics. This determining 328 can be accomplished using any random or systematic assignment process that results in an approximately equal distribution (per unit of processing capability) between the various network probes.

In one example, new user plane packets (and therefore new sessions) are sent to the network probes 124 in a "round robin" process: that is, each new user plane packet is assigned to one of the network probes sequentially. For example in the system 100, because there are three network probes—124A, 124B, and 124C—each system receives every third new session-instance. In other examples, a user plane packet can be assigned using a value in the packet known to change within certain ranges. For example, each network probe 124 can be assigned a subset of the values from 0 to 9, and the last digit of a phone number associated with a mobile user client can be used to assign the session-instance to the monitoring system with the subset containing the digit. Similarly, the IP address, Tunnel ID, MAC ID, or MOD ID can be used to distribute session-instances between the network probes 124.

One advantage of this automatic method of load balancing is that, assuming that a population of user plane packets has an approximately Gaussian size distribution, the distribution of user plane packets over the multiple network probes 124 will generally be equally distributed over time. While some packets will be larger and some user plane session-instances demand more processing and analytical resources of the assigned network probe 124, other user plane packets and other session-instances assigned to the same probe will require less processing resources because of the Gaussian nature of the demands of the session-instances. This automatic balancing provides an efficiency advantage over more manual or more computationally expensive methods of distributing the analytical load using, for example, IP address blocks, MAC IDs, and other similar features used to assign a session-instance to a network probe.

Once determined 328, the session-instance identifier and the identity of the determined 328 network probe 124 are both saved 332 to a record. Once saved 332, as described above, subsequently transmitted user plane packets can be determined 324 to be part of the session-instance using this record. The network probe 124 associated with the session-instance can be identified 340, and the packet sent 336 to the appropriate network probe.

If the user plane packet is determined 324 to be associated with an existing session-instance, then the network probe 124 that has been assigned the session-instance is identified 340. This identification 340 is accomplished in much the same way as the session-instance is identified 320 using a value in the payload portion of the user plane packet. That is, the session-instance identifier is located in the data portion of the user plane packet and a record is examined for the network probe assignment for that identifier. Once the network probe 124 associated with the session instance is identified 340, the user plane packet is sent to the monitoring system 336.

One advantage of the methods and systems described above is that, in addition to automatically and statelessly balancing the processing load among the network probes, each session-instance can be evaluated on per user basis, thereby measuring the quality of an experience for a specific user during a specific session-instance. In one example, this can be accomplished at a network probe by first associating control plane packets and user plane packets from the corresponding session-instance using a unique identifier that is common to both control plane packets and their corresponding user plane packets, as described above. As shown in FIG. 3B, the Tunnel ID can be used for this purpose, as can the GTP field, or other field common to both control plane packets and user plane packets that identifies the session-instance.

Once the control plane packets and corresponding user plane packets are associated with one another, the user experience of the session-instance can be reconstructed, and measured, calculated, or otherwise evaluated using any of a number of quality metrics (e.g., voice quality, dropped call rate, web browsing experience, network connection success rate, etc.). The session-instance having been characterized, it can be associated with a specific user by referring to a unique user identifier (e.g., phone number, IMSI, or other globally unique user identifier) stored in the control plane packet. In this way, the quality of the experience for a specific user can be identified.

Purging the Control Plane Cache of Stale Control Plane Data

Figure 4:
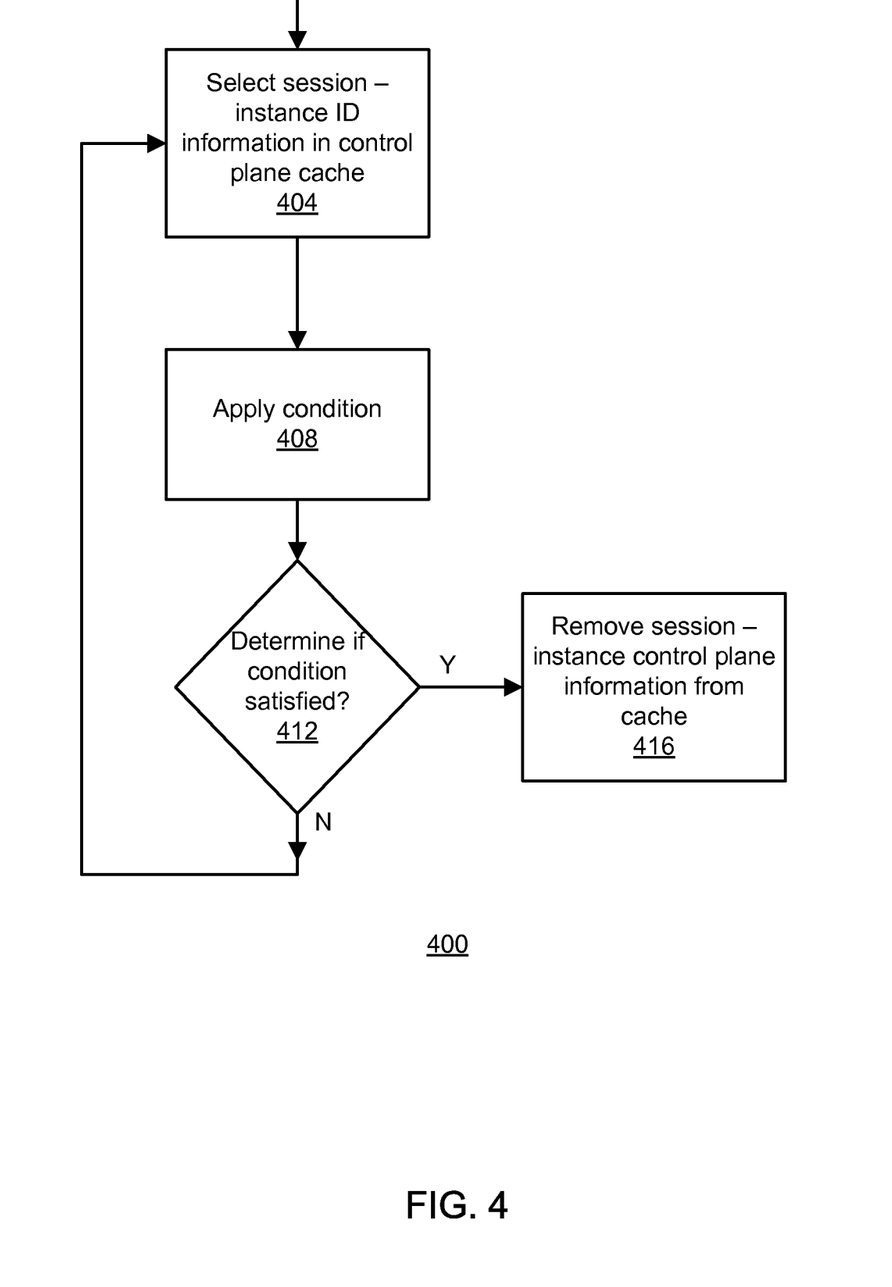
FIG. 4 is a flow diagram for removing stale control plane information from a cache of a network probe, in an embodiment.

As mentioned above, the control plane cache 216 of the network probe 124 stores the control plane information for each session-instance in every one of the network probes. In this way, regardless of where the user plane packets of a session-instance are routed, the network probe that receives the user plane packet will have the appropriate control plane information. However, the cache 216 can become filled with data that corresponds to session-instances that have been torn-down, assigned to a different network probe 124, are no longer active, or have never been active. In this case, the control plane cache 216 can be purged of control plane data that is no longer needed using example method 400.

In method 400, the identity of a session-instance having control plane information stored in a cache is selected 404 for evaluation against one or more conditions. These conditions are tests that are designed to identify session-instances that are no longer active, and can include the indicators of activity within a time window (e.g., bit transmission rate, packet transmission rate). Other conditions include an upper limit of the duration (or total time) that a session-instance is open (e.g., the time between set up and tear down of the session-instance). For example, a mobile phone can initiate a session-instance when first turned on, but not be active for many hours even after being turned on, or alternatively, may have never been active. A condition can impose a time limit to these types of sessions.

Regardless of the condition used to identify inactive session-instances, the selected performance or quality characteristic used as a condition is applied 408 to the data captured and/or produced by the network probe 124. The network probe 124 determines 412 whether the session-instance satisfies the condition, thereby indicating inactivity of the session-instance. If the session-instance does not satisfy the condition, then the control plane information remains in the control plane cache 216 for continued use. However, if the condition is satisfied, the control plane information of the session-instance is removed 416 from the cache 216. This method 400 then automatically purges the control plane cache 216 of state control plane information.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for routing packets at a packet flow switch, comprising:

receiving at a packet flow switch a packet having a header portion and a payload portion, the packet flow switch in communication with at least two network probes;

determining whether the received packet is a user plane packet or a control plane packet;

responsive to identifying that a user plane packet is associated with a new session-instance not already monitored by a network probe, assigning the user plane packet to one of at least two network probes, the assigning including:

selecting one of the network probes;

saving an identifier of the selected network probe and associating a packet session-instance identifier with the saved identifier of the selected network probe which includes identifying the session-instance identifier of the received user plane packet using a value in a payload portion of the packet at a fixed number of bits from a first end of a header portion of the packet; and sending the user plane packet to the selected network probe; and selecting a control plane packet associated with a session-instance of a network, the control plane packet stored in a memory of a network probe;

determining whether a condition measuring the inactivity of the session-instance is met; and responsive to determining that the condition is met, removing the control plane packet of the session-instance.

2. The method of claim 1, wherein the condition measuring the inactivity of the session-instance is a duration of the session-instance.

3. The method of claim 1, wherein the condition measuring the inactivity of the session-instance is a bit transmission rate.

4. The method of claim 1, wherein the condition measuring the inactivity of the session-instance is a packet transmission rate.

* * * * *